(No Model.) 3 Sheets—Sheet 1.
C. F. SHEDD.
STRUCTURE FOR HANDLING VICIOUS ANIMALS.
No. 320,710. Patented June 23, 1885.
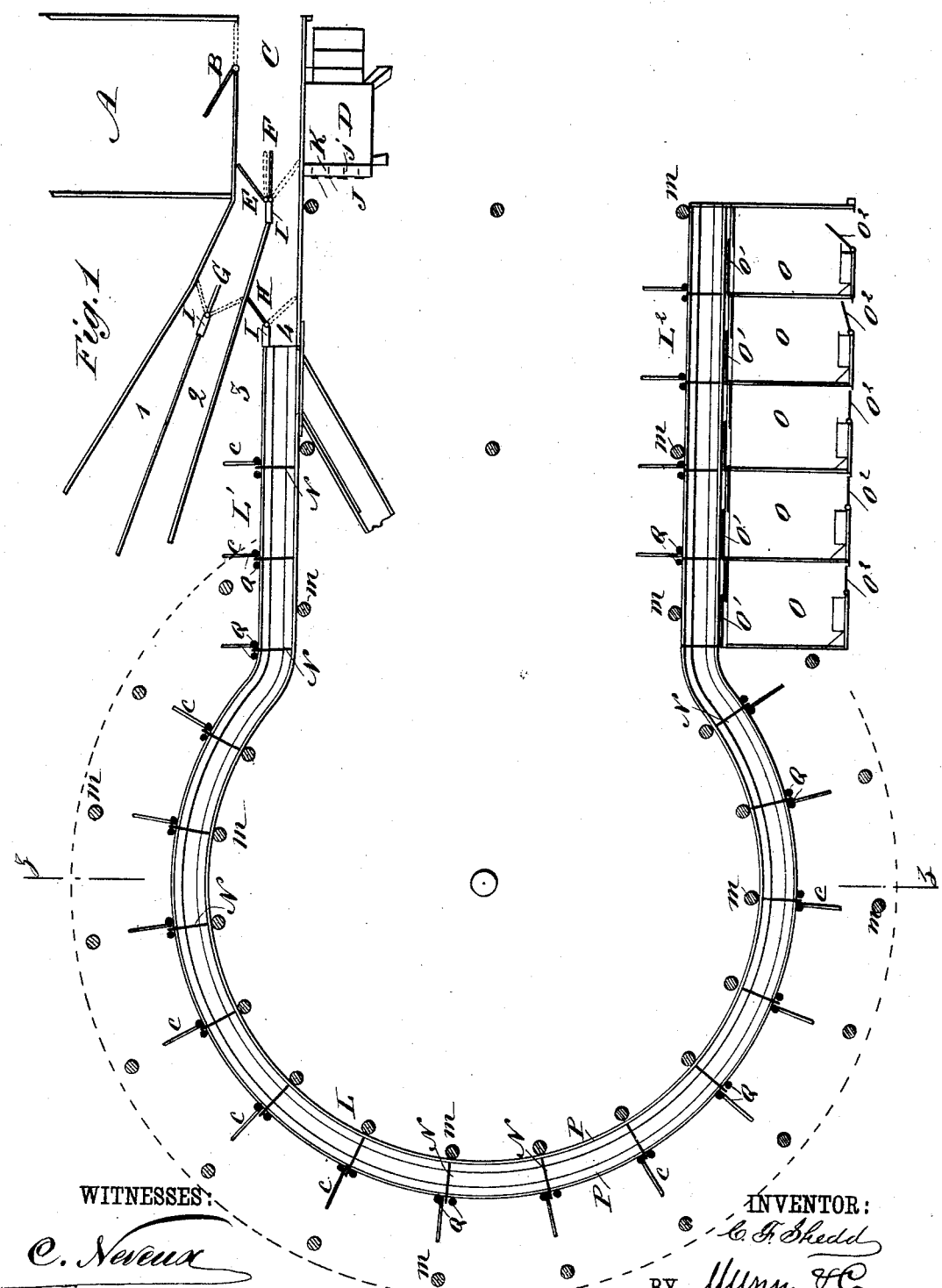
WITNESSES:
C. Neveux
C. Sedgwick
INVENTOR:
C. F. Shedd
BY Munn & Co.
ATTORNEYS.

(No Model.) 3 Sheets—Sheet 2.
C. F. SHEDD.
STRUCTURE FOR HANDLING VICIOUS ANIMALS.
No. 320,710. Patented June 23, 1885.
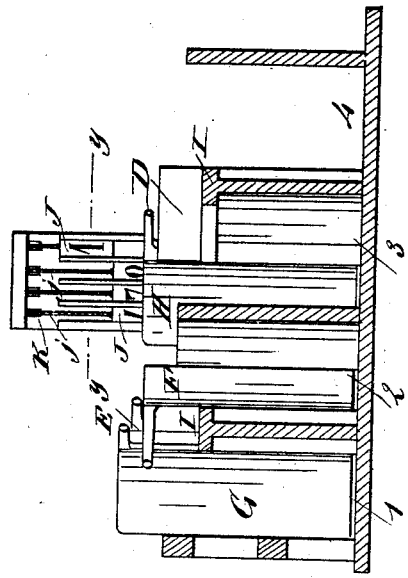
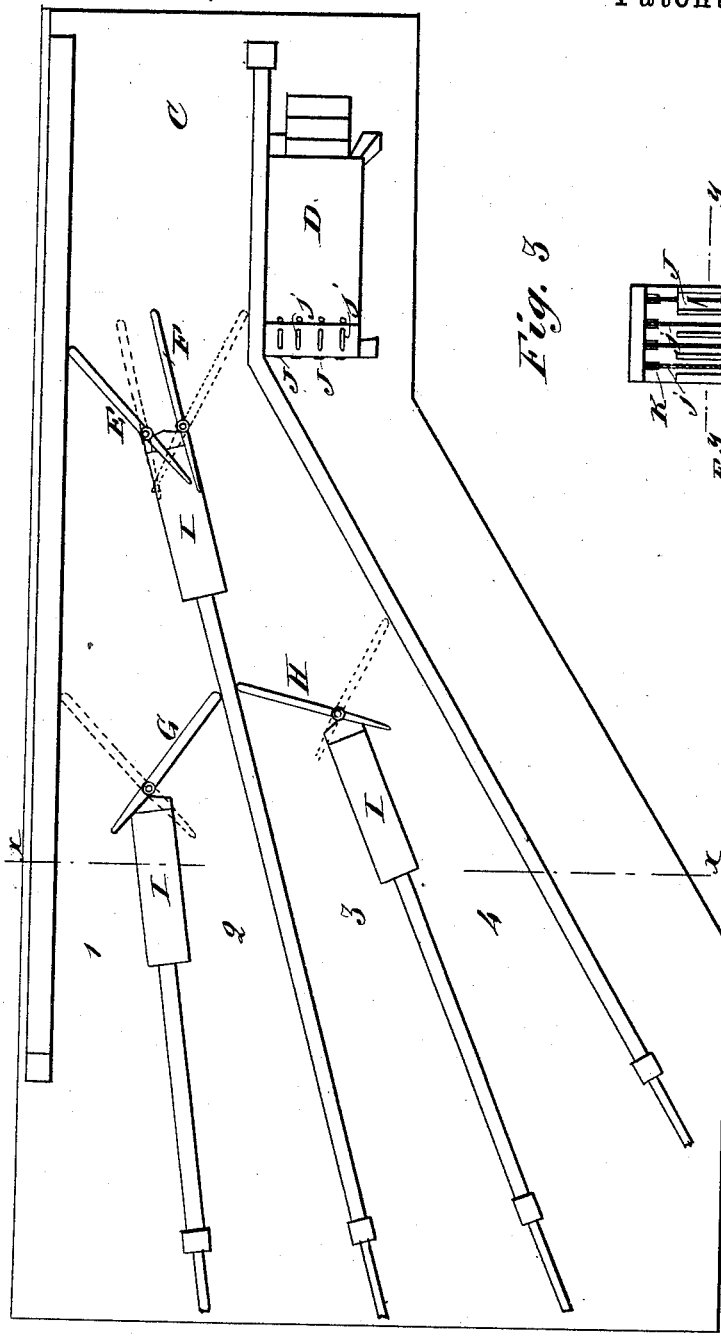
WITNESSES:
C. Neveux
C. Sedgwick
INVENTOR:
C. F. Shedd
BY Munn & Co.
ATTORNEYS.

(No Model.) 3 Sheets—Sheet 3.
C. F. SHEDD.
STRUCTURE FOR HANDLING VICIOUS ANIMALS.
No. 320,710. Patented June 23, 1885.

WITNESSES:
C. Neveux
C. Sedgwick

INVENTOR:
C. F. Shedd
BY Munn & Co
ATTORNEYS.

UNITED STATES PATENT OFFICE.

CHARLES F. SHEDD, OF FAIRFIELD, NEBRASKA.

STRUCTURE FOR HANDLING VICIOUS ANIMALS.

SPECIFICATION forming part of Letters Patent No. 320,710, dated June 23, 1885.

Application filed July 3, 1884. (No model.)

*To all whom it may concern:*

Be it known that I, CHARLES F. SHEDD, of Fairfield, in the county of Clay and State of Nebraska, have invented certain new and useful Improvements in Structures for Handling Vicious Animals, of which the following is a full, clear, and exact description.

This invention relates to structures for handling vicious animals to tame and train them, whereby a number of animals may be treated at one and the same time. The structure is designed more especially for handling the wild horses of the west.

The invention consists, principally, of a long chute built of parallel walls, and made continuous to entrance chutes or pens, with separating-gate for grading or separating out the animals to be trained.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 5:
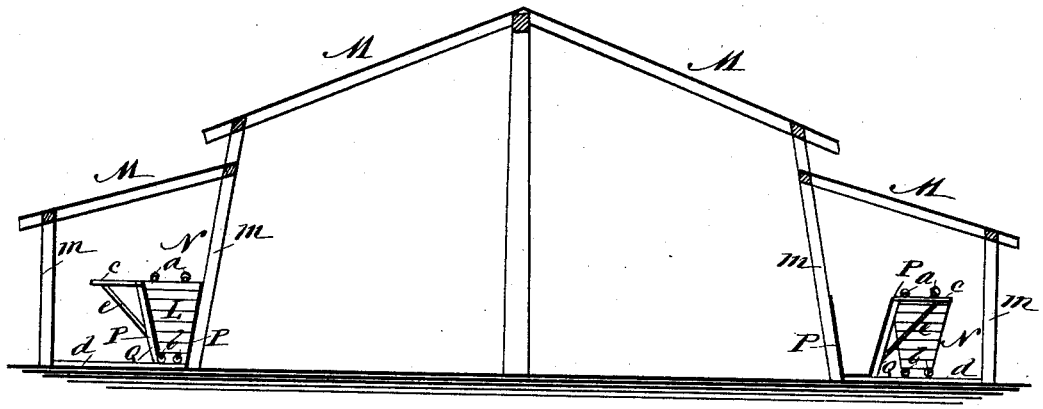
Figure 6:
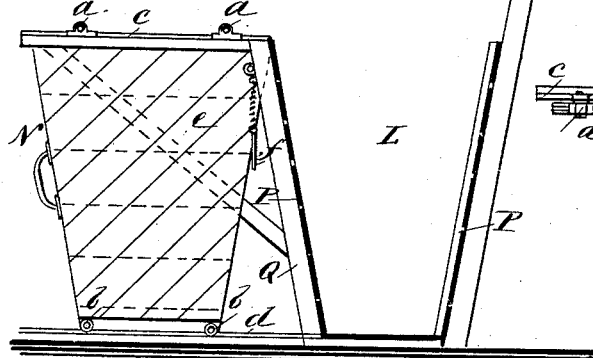
Figure 7:
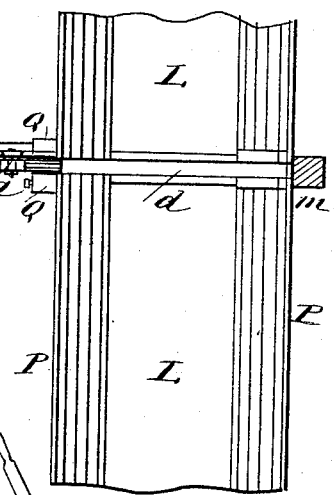
Figure 8:
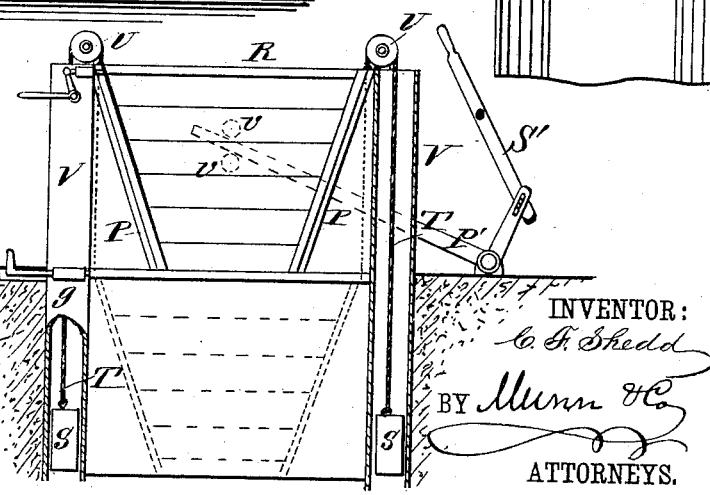

Figure 1 is a plan view of my invention, the roof of the inclosure being removed. Fig. 2 is an enlarged plan view showing the chutes and gates and the platforms on which the gate-operators and the assorter stand. Fig. 3 is a sectional elevation taken on the line $x\ x$ of Fig. 2. Fig. 4 is a sectional plan view taken on the line $y\ y$ of Fig. 3. Fig. 5 is a sectional elevation taken on the line $z\ z$ of Fig. 1, and showing the roof. Fig. 6 is a detailed sectional elevation of the main chute, showing one of the horizontally-sliding gates for dividing the main chute into stalls. Fig. 7 is a detailed plan view of the same; and Fig. 8 is a detailed sectional elevation of a vertically-sliding gate, which may be used in place of the horizontally-sliding gates shown in the other figures of the drawings.

Referring to the drawings, A represents a common pen or an alley leading from a large yard in which the untamed horses, mules, or oxen are herded, and this pen or alley A is connected by the gate B with the smaller alley C, into which the animals are run singly.

D is a platform on which the man who assorts the animals stands, assigning the different grades of stock to different yards or pens through the chutes—numbered in this instance 1, 2, 3, and 4—the single-acting gates E F and double-acting gates G H being properly turned by men standing on the platforms I I in answer to the signal-boards J J, which are held in suitable ways formed in or upon the upright board K, and adapted to be raised into and lowered out of view by the assorter on said platform D by means of the cords $j\ j$, attached to the signal-boards.

By making the stalls in connecting series adapted to be separated by gates N, many animals may be handled at the same time, and by opening all of the gates animals can be conducted from the entrance at chute 4 to the box-stalls O; or by closing any of the gates in front and rear of the animal he can be stopped and confined at any desired part of the circuit or series of stalls, thus enabling the animals to be very expeditiously and conveniently handled in large numbers.

The training or taming stalls may be built in a train or connected series in any desired form, or they may be made straight, as shown at $L'\ L^2$, or circular, as shown at L, or both straight and circular, as shown in Fig. 1, which latter is the preferred plan, since by this arrangement they may be easily covered by suitable inclosures, M, (shown in Fig. 5,) the roofs of which are supported upon the posts $m$. (Shown in Figs. 1 and 5.)

The stalls in chute 4 are separated from each other by the sliding gates N. When all of these gates are open, the animals, as many as desired, may be run from chute 4 through the stalls to the pens O, where, by closing the gates $O'\ O^2$, they may be kept and fed as long as desired.

When the animals are wild and dangerous to handle, they will be kept in the stalls by closing the gate N, and treated kindly until, by degrees, they become gentle and tame; and in order that the animals may be reached and kept from injuring themselves the sides P P of the stalls are made slanting upward and outward, the stalls being, by preference, made two feet wide at the bottom, four feet wide at the top, six feet high, and eight feet long, thus furnishing a comfortable space for the animal, and at the same time preventing him from turning in the stall.

The gates N run upon rollers *a b* at top and bottom on rails *c d*, the latter being laid upon the ground or floor of the stalls or inclosure, the former being attached to the upper end of the posts Q Q, between which the gates slide, and are held by the braces *e*, as shown clearly in Figs. 5 and 6. The gates N may be locked in closed position by the pins *f*, or by other suitable means.

In some instances, in place of the horizontally-sliding gates N, I shall use the vertically-sliding gates R, (shown in Fig. 8,) fitted in suitable openings made in the bottom of the stalls, and adapted to be forced down into an excavation made in the ground to bring the top of the gate flush with the bottom of the stalls, where the gates may be held by the sliding pin *g* or other suitable means.

For raising this gate R, I provide the weights S S, attached to the gate by the cords T T, which pass over the pulleys U U, journaled at the top of the hollow posts V V, in which the weights S S are placed, as will be clearly understood from said Fig. 8, and in most cases I shall employ the bell-crank lever P' and the hand-lever S' for raising and lowering the gate R, the long arm of the lever P' being held between the friction-rollers *v v*, secured to the gate; and spring-catches may be provided for locking the gate in lowered and elevated position, if desired.

Having thus described my invention, I claim as new and desire to secure by Letters Patent—

1. The walls P P, built parallel with each other to form a long chute continuous to the entrance-chute 4, in combination with side chutes and gates E F H, for separating the animals, as set forth.

2. The walls P P, made parallel with each other and connected at one end to the walls that inclose the stalls O, and at the other to the entrance-chute 4, the walls P P being provided with gates N, substantially as and for the purposes set forth.

CHARLES F. SHEDD.

Witnesses:
O. P. ALEXANDER,
C. B. TRACY.